United States Patent [19]

Sollars

[11] 4,131,082
[45] Dec. 26, 1978

[54] ANIMAL FEEDING EQUIPMENT

[76] Inventor: Herbert M. Sollars, 609 S. Main St., Washington Court House, Ohio 43160

[21] Appl. No.: 763,860

[22] Filed: Jan. 31, 1977

[51] Int. Cl.$^2$ .................... A01K 05/00; A01K 05/02
[52] U.S. Cl. .................................... 119/51.5; 119/80
[58] Field of Search ............... 119/51.5, 51.11, 77, 119/80, 76

[56] References Cited

U.S. PATENT DOCUMENTS

| | | | |
|---|---|---|---|
| 1,872,645 | 8/1932 | Barker | 119/77 |
| 3,016,044 | 1/1962 | Sollars | 119/77 X |
| 3,405,687 | 10/1968 | Rüter | 119/78 |
| 3,585,969 | 6/1971 | Crane et al. | 119/51.5 |

*Primary Examiner*—Hugh R. Chamblee
*Attorney, Agent, or Firm*—Jerome P. Bloom

[57] ABSTRACT

The invention improvements are embodied in animal feeding apparatus including a storage tank for liquid and means for a supply of dry feed in overlying vertically spaced relation to a feed tray. The apparatus features improved controls triggered by the animals which feed from the tray. The storage tank for the liquid has a discharge opening in its bottom rimmed by dependent tube structure the lower extremity of which is continuously immersed in the liquid feed provided in the tray. A hollow valve structure is mounted in the tank to normally close and seal its discharge opening. Means in connection with the dependent tube structure trigger an automatic opening of said valve when the mixture in the tray drops to a predetermined level which is above the dependent extremity of the tube structure. The latter means include a small bore vent tube, one end of which is continuously exposed to the atmosphere and the other end of which is located interiorly of the tube structure, adjacent its bottom, and faces upwardly thereof to be in continuous communication with the interior of the valve member, by way of an access opening therein, when the valve is in a closed position. As the valve is displaced from its closed position, it triggers means operative to deliver a measured supply of dry feed to the underlying tray.

12 Claims, 5 Drawing Figures

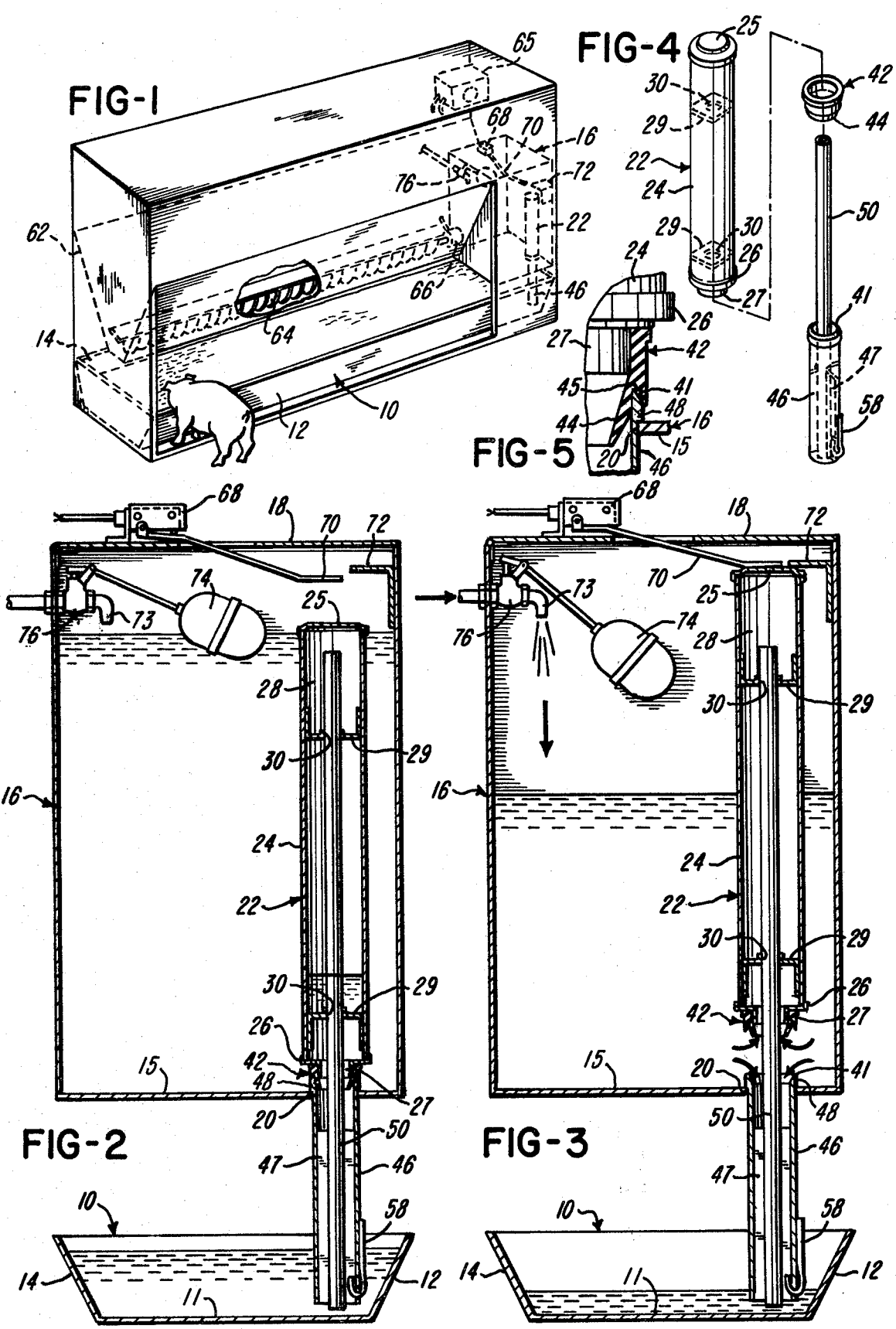

ANIMAL FEEDING EQUIPMENT

BACKGROUND OF THE INVENTION

This invention relates to improved controls for animal feeders. As herein illustrated, these controls are embodied in connection with a storage tank serving as a receptacle for a supply of water mounted in elevated spaced relation to an underlying feed tray and functionally related to a supply of dry feed. The arrangement is such that when feeding animals cause the mixture in the tray to fall to a predetermined level, the controls are responsively caused to automatically function to replenish the tray with water and dry feed, in the proper proportions.

The pertinent prior art is best exemplified in U.S. Pat. No. 3,016,044. While the apparatus therein illustrated has worked remarkably well, it has been found that unforeseen external factors can cause a malfunction thereof during extended periods of limited feeding, such as during night hours. This malfunction has been found to occur when the level of the liquid matter in the feed tray falls to a point where it is about to, but does not quite clear the lower end of the extension 15 depending from the overlying tank 10 shown in the U.S. Pat. No. 3,016,044. Under such circumstances, if the apparatus is subjected to vibration, such as may occur, for example, when water is drawn, for unrelated purposes, from the line serving to maintain a supply thereof in the storage tank 10, or when the feeder structure is repeatedly bumped by a feeding animal, there can be a temporary break in the attachment of the water to and about the lower end of the extension 15. This produces a temporary air passage permitting small quantities of air to enter the extension 15 and the pipe 18 illustrated in said patent. This air will pass into and increase the buoyancy of the flotation-type valve member which normally seals the tank discharge opening. Repeated occurrences of this nature can increase the buoyancy of the valve member to such an extent as to place the valve member in an unstable condition, under which circumstances it may be temporarily or partially unseated, to a limited degree, under the influence of further applied vibration. The degree of unseating of the valve is generally minimal and sufficient only to result in leakage of small amounts of water from the storage tank to the underlying tray. However, if unobserved, the leaking water will eventually fill the tray, and without a proportioned addition of the dry feed which is essential to the diet of the feeding animals. It will be understood, of course, that unless the leaking water is accompanied by a prescribed amount of dry feed, the resulting mixture in the feed tray will provide an improper diet for the feeding animals and their health will be impaired.

The aforementioned problem has occurred and can occur only under certain unusual conditions such as above set forth and it can be compensated for on careful watch of the apparatus on the part of the farmer. However, this is not a practical solution to the problem. The proper solution to the problem is one which will relieve the burden and the responsibility for careful attendance on the part of the farmer and this is what has been simply but quite uniquely, effected by the present invention.

SUMMARY OF THE INVENTION

The embodiment of the invention herein illustrated provides automatically and precisely functioning animal activated feed controls in connection with a storage tank for water mounted for discharge of its contents, in controlled amounts, through a discharge opening in its bottom, to an underlying feed tray. The controls comprise two main structural units. One unit constitutes a hollow valve member positioning interiorly of said tank, normally to cap its discharge opening. The other of these units comprises a composite tube structure including a pair of concentrically positioned tubes, the inner of which has a substantially smaller diameter and a much greater length than the outer. The outer of these tubes is fixed to extend from and perpendicular to the bottom of the tank and to have its dependent extremity continuously immersed in the feed mixture provided in the bottom of the tray while a portion of its uppermost extremity is fixed to and in rimming relation to the tank discharge opening. As the outer of said tubes is so fixed, the inner thereof projects upwardly through the tank discharge opening to mount in slidable relation thereto, interiorly of the tank, the aforementioned hollow valve member. The arrangement is such that the upwardly directed projected end of the inner of said tubes serves as a guide accommodating the movement of the said hollow valve member to and from a capping and sealing relation to the discharge opening of the storage tank. The lowermost end of said inner tube element projects below the dependent extremity of the outer tube, to a very slight degree.

A small bore bleeder tube is embodied in connection with the outer tube element of the composite tube structure which extends from the bottom of the storage tank. In the preferred embodiment illustrated, the major extent of the bleeder tube is positioned exterior of said outer tube to which it mounts, to extend upwardly thereof and have its open upper end terminate at a level which is positioned above the top of the feeder tray. The portion of the bleeder tube which is exteriorly positioned has the lower end thereof continued by a relatively shorter portion which is bent and projected through an aperture in the wall defined by the outer tube, adjacent the lower end thereof, and then reversely bent interiorly of the outer tube segment and directed upwardly thereof to assume a hook-shaped form.

An access opening at the top of the storage tank is capped by a lid structure on the outer surface of which is mounted a switch connected to an appropriate drive motor for an auger-type feed dispensing device positioned to extend above and in a generally spaced, parallel, relation to the feeding tray, substantially the length thereof and to one side of the storage tank. The switch has a control element which is mounted to project interiorly of the tank through an opening in the lid and to have its lowermost extremity lie in the path of an upward movement of the hollow valve member. Also positioned above and in the path of an upward movement of the hollow valve member is a stop, the purpose of which is to limit said upward movement.

Connected to extend into the storage tank, through an upper side wall portion thereof adjacent its top, is the discharge end of a water line, the opposite end of which may be connected to a continuing supply of water. This discharge end of the water line incorporates a valving device under the influence of a connected float.

In preparing the above described apparatus for use as an animal feeder structure of the nature described, the feed tray is first filled with a feed mixture comprised of water and dry feed the precise proportions of which are predetermined in accordance with the nature of the diet required by the feeding animals. The arrangement of the controls are such that when the feeding animals deplete the supply of the feed mixture in the tray to a predetermined level, which level, per the invention, will be above the dependent extremity of said composite tube structure, then air, external to the described structure, will be under sufficient pressure to pass to and through the aforementioned small bore bleeder tube and move upwardly of the composite tube structure by way of the passage defined between the outer and inner tube elements thereof, and through any liquid feed which may be contained therein, and pass up into and to the top of the interior of the hollow valve member in the storage tank, thereby to render such valve member buoyant and cause an abrupt and sudden displacement thereof from its normal sealing and capping relation to the tank discharge opening. As this occurs, water in the tank will flow through the tank discharge opening and by way of the passage defined between the tube segments of said composite tube structure, to enter the feeding tray adjacent its bottom and below the level of the mixture therein and cause its level to rise towards the top of the tray. At the same time as water is delivered to the tray, a certain amount of water will enter the hollow valve member by way of the access opening to its interior which is provided in its lowermost extremity. As the hollow valve member is thereby rendered buoyant and moves upwardly of the storage tank, as a result thereof, it will, as it comes up to the overlying stop, hit the control for the switch mounted on the lid of the storage tank. As this control is hit, it will energize the drive motor of the feed dispensing auger, whereupon the arrangement is such that the auger will be caused to turn a predetermined interval of time sufficient to enable it to drop a measured amount of feed into the mixture which now exists in the underlying tray. The amount of feed delivered to the tray will be precisely proportioned to the amount of water which is discharged from the storage tank prior to the hollow valve member dropping once more to effect a seal of the tank discharge opening.

The structure here defined is simple but capable of automatic and precise functioning in response to an activation thereof by the feeding animals. It is a feature of the present invention that there can be no inadvertent leakage of water from the storage tank. In no instance are the controls subject to instability or malfunction under the influence of externally applied vibration.

It is therefore a primary object of the invention to provide animal feeding apparatus which is economical to fabricate, more efficient and satisfactory in use and adaptable to a wide variety of applications.

Another object of the invention is to provide improvements in animal feeding apparatus which enable the feeding animals per se to be in complete control of its operation without danger of its malfunction in the process.

An additional object of the invention is to provide improvements in controls for animal feeders enabling the contents of the feed trays thereof to be automatically replenished with a proper liquid-solid feed mixture as and when required.

Another object of the invention is to provide improvements in animal feeders and controls therefor possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein one but not necessarily the only form of the embodiment of the invention is illustrated, FIG. 1 is a perspective view of an animal feeder embodying the improvements of the present invention;

FIG. 2 is a sectional view illustrating the essential control elements in their normal positions;

FIG. 3 is a view similar to FIG. 2 illustrating positions of the control elements as they are being activated by feeding animals;

FIG. 4 is an exploded view of the primary control structure embodied in the apparatus of FIGS. 1-3; and FIG. 5 is an enlarged fragment of the sectional view of the control structure observable in FIG. 2 illustrating pertinent detail thereof.

Like parts are indicated by similar characters of reference throughout the several views.

DESCRIPTION OF THE PREFERRED EMBODIMENT OF THE INVENTION ILLUSTRATED IN THE ACCOMPANYING DRAWINGS

The invention embodiment herein disclosed is described and illustrated in a generally schematic fashion and only to the extent necessary for an understanding of its essential features. Such portions of the described structure as are not detailed will be readily understood and may be easily contrived by any person versed in the art.

The hog feeder illustrated embodies, at its bottom, a generally rectangular feeding tray 10 the front and rear sides 12 and 14 of which are upwardly divergent. Mounted in superposed relation to the tray 10, at one end thereof, is a water storage tank 16. An access opening at the top of the tank 16 is normally closed by a hinged lid portion 18. The only other opening to or from the tank 16 is a discharge opening 20 at its bottom.

Positioned interiorly of the tank 16 is a generally cylindrically shaped hollow float type valve member 22 comprised of an axially elongated tubular wall structure 24 closed at one end by a cap 25, which positions uppermost as the valve member mounts, in a manner to be further described, in a coaxial relation with the tank discharge opening 20. The lowermost end of the valve member 22 is partially closed by a centrally apertured cap 26. The outer flanged peripheral edge portion of the cap 26 is welded to and about the lower edge of the wall structure 24. Formed integral with the inner peripheral edge of the cap 26 is an outwardly projected tube segment 27 which rims the central aperture in the cap and thereby defines the single access opening to the generally elongate cylindrical chamber 28 defined interiorly of the valve member 22. Particular attention is directed to the fact that the chamber 28 has a generally uniform diameter from one cap portion to the other.

The chamber 28 is bridged by a pair of longitudinally spaced centrally apertured guide plates 29, outer peripheral edge portions of which are fixed to the wall structure 24 to establish their central apertures 30 in a coaxially aligned relation with each other and also with the single access opening defined by the central aperture in the cap 26.

Projected through the discharge opening 20 in the bottom wall of the tank 16 is a tube segment 46. The outer diameter of the tube 46 is substantially equal to the diameter of the discharge opening 20. As here provided the tube segment 46 extends from and projects substantially perpendicular to the bottom wall 15 of the tank 16, through the medium of an external flange 48 in connection with one end thereof which seats to the inner surface of the wall 15 in rimming relation to the tank discharge opening 20. The flange 48 is welded to and thereby fixedly secured with respect to the botton wall of the tank. The length of the tube 46 is such to extend within and almost to the botton 11 of the tray 10.

Fixedly positioned within and in concentric spaced relation to the tube segment 46, by radially directed supports 47, is a smaller diameter and substantially longer tube 50. By reason of the position of the tube 50 with respect to the tube segment 46, the lower end of the tube 50 projects slightly outward of the lowermost end of the tube 46 while the upper end thereof projects through the center of the discharge opening 20 and upwardly and inwardly, to a substantial extent, of the storage tank 16, wherein it projects interiorly of the valve member 22 by way of the single opening defined in the cap 26 and through the apertures 30 in the guide plates 29. The arrangement provides that the valve member 22 mounts on the upper end of the tube 50, in bearing relation thereto, in a manner to provide for a controlled vertical movement thereof to and from the bottom wall of the tank 16. The orientation of the valve member 22 so provided maintains its single access opening in a coaxial relation with the tank discharge opening 20.

Slip fit on and in connection with the lowermost end of the valve member 22, in surrounding relation to the tubular projection 27, is a sleeve-like seal member 42 which is formed of rubber or elastomeric material. The one end portion of the seal 42 which positions about the tubular projection 27 has a generally cylindrical configuration and one end thereof in abutment with the outer surface of the cap 26. The opposite end of this seal portion of generally cylindrical configuration has the inner peripheral edge portion thereof extended by an axial projection 44 which has an outwardly convergent generally conical configuration and its outer peripheral edge portion is formed, immediately about the base of the conical projection 44, with an annular groove 45.

As may be seen from the drawings, when the valving member 22 seats in a capping relation to the discharge opening 20, the groove 45 receives therein a complementarily shaped annular projection 41 formed on the externally flanged uppermost end of the tube segment 46 which positions interiorly of the tank 16 and in rimming relation to its discharge opening.

A small bore bleeder tube 58 has a fixed connection with the lower end portion of the tube segment 46. The major extent of the tube 58 is fixed external to and extends upwardly of the outer side surface of the tube 46. Its lowermost end is bent inwardly of and projected through a radial aperture in the wall of the tube 46 at a point adjacent and spaced from its lowermost extremity. As this bent portion projects inwardly of the tube segment 46, it is bent upwardly of its interior. The small bore tube 58 is thus provided with a lower hook-like extremity the end of which innermost of the tube segment 46 has a relatively short vertical extent and opens in a facing relation to the tank discharge opening 20. Note that the outer and uppermost end of the tube 58 positions above the upper limit of the tray 10 and substantially above its lowermost end which positions interiorly of the dependent extremity of the tube segment 46 which is located within the boundaries of the tray 10. Solder is applied about the tube 58 at the location of the aperture through which its hook-shaped extremity is passed to the interior of the tube segment 46. As thus provided, the small bore bleeder tube 58 defines a vent passage which maintains the atmosphere in continuous communication with the interior of the tube segment 46.

As will be seen, the space between the tube segment 46 and the tube 50 provides a passage for water to move from the tank 16 to the tray 10, by way of the discharge opening 20. Particular attention is directed to the fact that in accordance with the invention, the lowermost extremities of the tube segment 46 and tube 50 are both positioned in closely adjacent relation to the bottom of the tray and arranged to be continuously submerged in the mixture of water and feed which is supplied to the tray for animal feeding purposes. Moreover, the composite tube structure 46, 50, and 58 uniquely serves to provide a pressure control for the valve member 22 which is mounted for sliding movement on and with respect to the end of the tube 50 which projects interiorly of the storage tank 16.

The system of the invention provides that as long as the mixture of water and solids forming the feed in the tray 10 is above a predetermined level, which predetermined level is above the lowermost extremity of the tube segment 46, valve member 22 will seat over and in capping relation to the discharge opening 20. In such a position the sealing element 42, in connection with the valve member, will nest the projection 41 on the upper end of the tube segment 46 which projects interiorly of the tank 16 and a seal will be formed therebetween precluding leakage of water from the tank.

Mounted over and extending in spaced elevated relation to and the length of the tray 10, to one side of the tank 16, is a hopper-like structure 62 having fore and aft converging side walls, the lower extremities of which define a narrow feed slot, immediately above which is positioned, the length thereof, an auger-type feeder device 64. A drive motor 66 connected in driving relation to the device 64, to one end thereof, is connected by suitable wiring to a switch-type control device 68 which mounts on thd lid 18 of the tank 16. The switch device and the motor 66 are connected in a circuit which includes an appropriate connection to a source of power. The switch device is normally open and has an actuator in the form of a finger-like control element 70 which projects through an opening in the lid 18 to have its lowermost end positioned over and in vertically spaced relation to the upper end of the valve member 22 as the latter seats to close the discharge opening 20. As will be seen, when the valve member is rendered sufficiently buoyant it will move upwardly of the tank 16 and engage the finger element 70 to thereby close the switch 68. This energizes the motor 66, the circuit of which includes an automatic resetting interval timer 65 which is also energized by the closing of the switch 68 to limit the energizing of the motor to a predetermined brief interval of time. During this interval of time the motor 66 will drive the auger type feeder device 64 for a period sufficient only to cause dry feed to be dropped, in a conventional manner, from the auger to the liquid in the tray 10, in such amounts as are in direct proportion to the amount of fresh water which is delivered from the tank 16 during the time that the valve member 22 is displaced from its normal sealing and capping relation to the discharge opening 20.

In use of the apparatus above described, the tray 10 will in the first instance be filled with liquid feed wherein the liquid and solid content are precisely proportioned and designated to give feeding animals a proper diet. As the tray is filled with liquid feed, it will submerge the lower ends of the composite tube structure comprised of the tube segment 46, the inner tube 50 and the small bore bleeder tube 58. Note in FIGS. 2 and 3 that the upper end of the bleeder tube 58 will always be above and clear of the tray 10 and provide an opening to the vent passage defined by the bleeder tube which communicates the atmosphere with the interior lower end portion of the tube segment 46. The vertical extent as well as the position of the tube 58 will determine the precise predetermined level to which the feed will fall to automatically induce a displacement of the valve member 22 from its sealing capping relation to the discharge opening 20 to initiate a fresh charge of water being delivered to replenish the supply thereof in the tray 10.

With the tray appropriately filled with feed, the water and feed mixture will fill in part the composite tube structure as well as the lower end portion of the chamber 28 in the valve member 22. It is the water in the chamber 28 that reduces the buoyancy of the valve member sufficiently to maintain it in a lowermost position in the tank 16, in which position it forms a seal, with the upper end of the tube segment 46, of the tank discharge opening 20. As animals consume the feed in the tray not only will the level of the mixture in the tray drop but the level of the water in the composite tube structure and in the chamber 28 will drop. The lower and innermost end of the tube 58 will position in the lower end of the tube segment 46 and in the liquid mixture contained therein. The bleeder tube 58 communicates atmospheric pressure with the interior of the tube segment 46, which atmospheric pressure has in opposition thereto the head which is established by the water and feed column upwardly of the innermost end of the small bore vent passage provided by the tube 58. Of course, there will be air trapped, initially, in the upper end of the chamber 28 and above the upper open end of the tube 50. As the level of the liquid and/or liquid feed mixture in the composite of the valve member 22 and the tube structure aforementioned falls with a reducing level in the feed tray, it will reach a point where the atmospheric pressure is sufficient to induce the flow through the small bore tube 58 of sufficient air under pressure to move upwardly of the tube segment 46 and by way of the discharge opening 20 and the tube segment 27 to the interior of the chamber 28. This air rising to the top of the chamber 28 assists in displacement of water therefrom and renders the valve member buoyant. In response the valve member, guided by the tube 50, moves upwardly of the tank 16 to first encounter the control finger 70 and then a stop member 72 which limits its upward movement. As the valve member 22 moves upwardly and breaks the seal between it and the upper end of the tube segment 46, water moves freely from the tank 16, to and through the passage defined by the tube segment 46 and the tube 50 to flow to and enter the mixture in the tray 10 adjacent its bottom. At the same time, water will also be drawn interiorly of the lower end of the valve member 22 as a natural course of events. The elements are so proportioned and designed that when a predetermined amount of water has passed from the tank 16 to the tray 10, there will at that time be sufficient water over the annular cap 26 on the chamber 28 and a sufficient reduction in the buoyancy of the valve member to cause it to automatically return to its lowermost position in which it seals, once more, the discharge opening 20. The switch 68 is closed approximately at the time the appropriate amount of water is being delivered from the tank 16, whereupon the motor 66 is energized for the period of time which has previously been set on the interval timer 65. This results in the dropping of a predetermined amount of solid feed onto the top of the liquid in the tray 10. The whole operation is simple and automatic in nature.

Attention is directed to the fact that a conventional float control 74 is in operative connection with a normally closed valve device 76 in a water delivery line connected into the top of the storage tank 16. This float control drops as the level of the water within the tank 16 falls by reason of the delivery of a predetermined quantity thereof to the tray 10. The dropping of this float induces an opening of the valve in the water line and correspondingly a refilling of the contents of the tank 16 to the predetermined level at which the water is originally set within the tank.

It is an essential feature of the invention that the predetermind level of the feed mixture in the tray designed to trigger displacement of the valve member 22 and the delivery of water to replenish the liquid in the tray 10 will always be above the lower extremity of the tube segment 46. Correspondingly both the lower ends of the tube segment 46 and the tube 50 will always remain submerged to a degree that there is no instance can be an inadvertent break between the upper level of the feed mixture in the tray 10 and the lower end of any portion of the composite tube structure. It will be self-evident of course that not only does the invention avoid the problems found to exist in the prior art but it will do so in a manner to insure the maintenance of a proper diet for feeding animals the constituents of which are delivered under the triggering influence of the animals feeding from the tray 10. Attention required for the described apparatus is accordingly minimal while at the same time there is insured healthy, contented animals and profitable breeding procedures.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. Apparatus for use in connection with a tank supported in spaced elevated relation to a tray-like receptacle, the tank serving for storage of liquid and having an opening for discharge of its contents to the underlying receptacle, comprising a hollow body for disposition within the tank for movement to and from a closing relation to its discharge opening, said body having means defining an opening therefrom which in the function thereof aligns with said tank discharge opening, the entrance of liquid to said body by way of the opening therein causing the movement of said body to a closing relation to said tank discharge opening to prevent the discharge of liquid from said tank, a discharge tube one end of which is fixed to rim said tank discharge opening to position the other end thereof within and in an adjacent spaced relation to the bottom of said receptacle, means defining an open passage one end of which is arranged to open to the interior of said discharge tube and the other end of which is arranged to open to the atmosphere, said discharge tube being arranged to have said other end thereof continuously immersed in liquid in said receptacle and said means defining said passage being constructed and arranged to induce the operation of said hollow body to maintain a predetermined level of liquid in said receptacle above the continuously immersed open end of said discharge tube.

2. Apparatus as in claim 1 wherein said passage is provided by a small bore tube, one end of which is exposed outwardly of said discharge tube and the other end of which is projected inwardly of and in open communication with the interior of said discharge tube.

3. Apparatus as in claim 1 wherein said means defining said passage is an element having a small bore one open end of which is projected through the wall of said discharge tube, to position adjacent but above the lowermost end thereof, and the other open end of which positions above said receptacle.

4. Apparatus as in claim 1 wherein said means defining said passage is a small bore tube, the major extent of which is fixed external to and directed upwardly of the outer wall surface of said discharge tube and a limited extent of which is formed in a hook-like configuration to provide its lowermost portion which is projected interiorly and directed upwardly of the lower end portion of said discharge tube.

5. Apparatus as in claim 1 wherein there is further mounted, in association with said storage tank and over said receptacle, means defining a hopper for dry feed, means for delivering dry feed from said hopper to said receptacle said storage tank having in connection therewith a control for actuating said dry feed delivery means which is operable by said body in the course of the movement thereof from its sealing relation to said tank discharge opening, and said dry feed delivery means being arranged to deliver a predetermined amount of feed to said receptacle in correspondence with the amount of liquid which is directed from said tank to said receptacle.

6. Apparatus as in claim 1 wherein a further tube is mounted in and in a spaced relation to the inner wall of said discharge tube to define therewith a discharge passage for liquid to exit from said tank when its discharge opening is open, said further tube being fixed and elongated to have on end extend through and outwardly of said other end of said discharge tube and to have to its other end project inwardly of said tank through its discharge opening to mount said body for a guided movement thereof to and from a capping and sealing relation to said tank discharge opening.

7. Apparatus as in claim 6 wherein said body has a generally axially extended cylindrical form and a generally uniform internal diameter.

8. Apparatus as in claim 7 wherein said further tube has said one end thereof projected slightly from the said other end of said discharge tube and the extremity of said other end thereof projected inwardly of said body, in a closed position thereof, to a point adjacent the upper end of the interior of said body.

9. Apparatus as in claim 7 wherein the lowermost end of said body as disposed in said tank includes means defining said opening therefrom which mounts a resilient ring-shaped seal formed to sealingly connect with the end of said discharge tube which rims said tank discharge opening by virtue of which to provide a seal of said tank discharge opening.

10. Feed apparatus particularly suited for animal usage, comprising a tank supported in spaced elevated relation to a tray-like receptacle, the tank serving for storage of liquid and having an opening for discharge of its contents to the underlying receptacle, a hollow body disposed within the tank for movement to and from a closing relation to its discharge opening, said body having means defining an opening therefrom which in the function thereof aligns with said tank discharge opening, the entrance of liquid to said body by way of the opening therein causing the movement of said body to a closing relation to said tank discharge opening to prevent the dischrage of liquid from said tank, a discharge tube one end of which is fixed to rim said tank discharge opening to position the other end thereof in a spaced adjacent relation to the bottom of said receptacle, said other end of said discharge tube being positioned to be continuously immersed in liquid in said receptacle, and means in connection with said dischrge tube, the construction and arrangement of which provides for air to move upwardly of said discharge tube and into said body to induce a lifting thereof from a closing relation to said tank discharge opening when the liquid in said receptacle drops to a predetermined level above the lowermost end of said discharge tube.

11. Apparatus as in claim 10 wherein means in connection with said tank is arranged to respond to a lifting of said body in said tank to dispense dry feed to the liquid in said receptacle in correspondence with the amount of liquid discharged from said tank during the time interval said body is lifted.

12. Apparatus as in claim 11 including means to deliver liquid to said tank in an automatic response to the liquid therein dropping to a predetermined level.

* * * * *

UNITED STATES PATENT AND TRADEMARK OFFICE
CERTIFICATE OF CORRECTION

PATENT NO. : 4131082
DATED : December 26, 1978
INVENTOR(S) : Herbert M. Sollars

It is certified that error appears in the above-identified patent and that said Letters Patent are hereby corrected as shown below:

Col. 6, line 48, "thd" is corrected to read -- the --.

Col. 8, line 34, "is" is corrected to read -- in --.

Col. 10, line 3, "on" is corrected to read -- one --.

Col. 10, line 37, "dischrage" is corrected to read -- discharge --.

Col. 10, line 43, "dischrge" is corrected to read -- discharge --.

Signed and Sealed this

Seventeenth Day of April 1979

[SEAL]

Attest:

RUTH C. MASON
Attesting Officer

DONALD W. BANNER
Commissioner of Patents and Trademarks